United States Patent [19]
Mallet

[11] 3,870,989
[45] Mar. 11, 1975

[54] UNDERWATER DIRECTION SIGNAL PROCESSING SYSTEM

[75] Inventor: Alfred L. Mallet, Pittsfield, N.H.

[73] Assignee: Sanders Associates, Inc., Nashua, N.H.

[22] Filed: Mar. 16, 1970

[21] Appl. No.: 19,979

[52] U.S. Cl. ............................... 340/6 R, 340/16 R
[51] Int. Cl. .............................................. G01s 3/80
[58] Field of Search ...................... 340/2, 6 R, 16 R

[56] References Cited
UNITED STATES PATENTS

| | | | |
|---|---|---|---|
| 3,054,053 | 9/1962 | Cook | 340/6 UX |
| 3,148,351 | 9/1964 | Bartlett | 340/6 |
| 3,176,262 | 3/1965 | Ehrlich et al. | 340/3 |
| 3,461,421 | 8/1969 | Stover | 340/2 |

Primary Examiner—Richard A. Farley
Attorney, Agent, or Firm—Louis Etlinger; William L. Hunter

[57] ABSTRACT

An underwater direction finding system comprises a sonobuoy unit which includes a pair of directional hydrophones, a compass for providing a reference to the earth's magnetic coordinates and a signal processing system aboard an airplane or a ship for providing directional information of received acoustical signals. The signal processing system selects one of the received transmitted signals for processing and converts this signal to be identical to the signal generated by the hydrophones; and these selected signals are processed to provide directional information of the acoustical signals referenced to the earth's magnetic coordinates.

14 Claims, 4 Drawing Figures

3,870,989
SHEET 1 OF 4
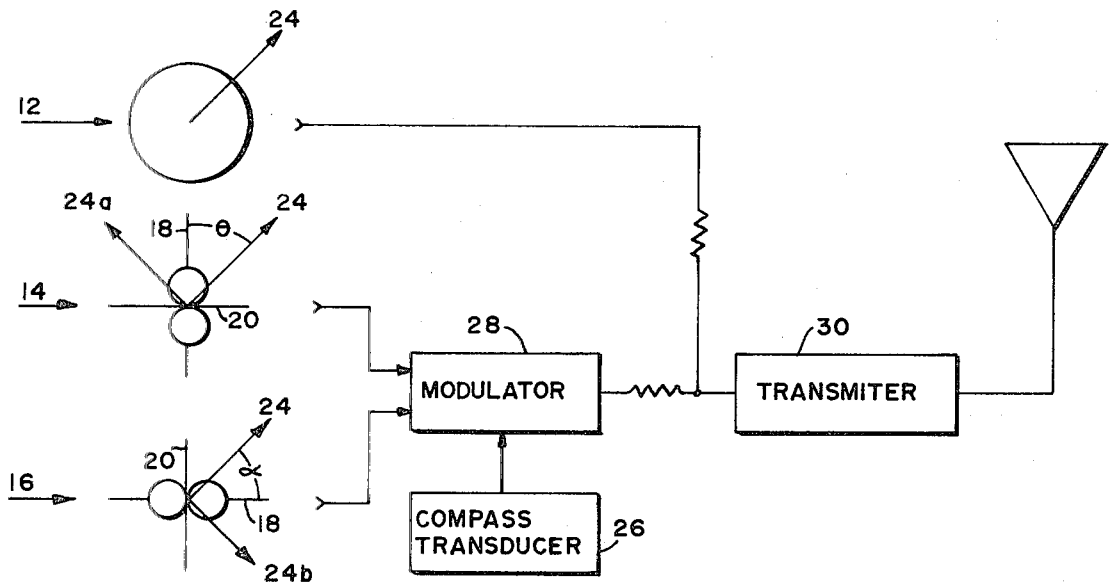
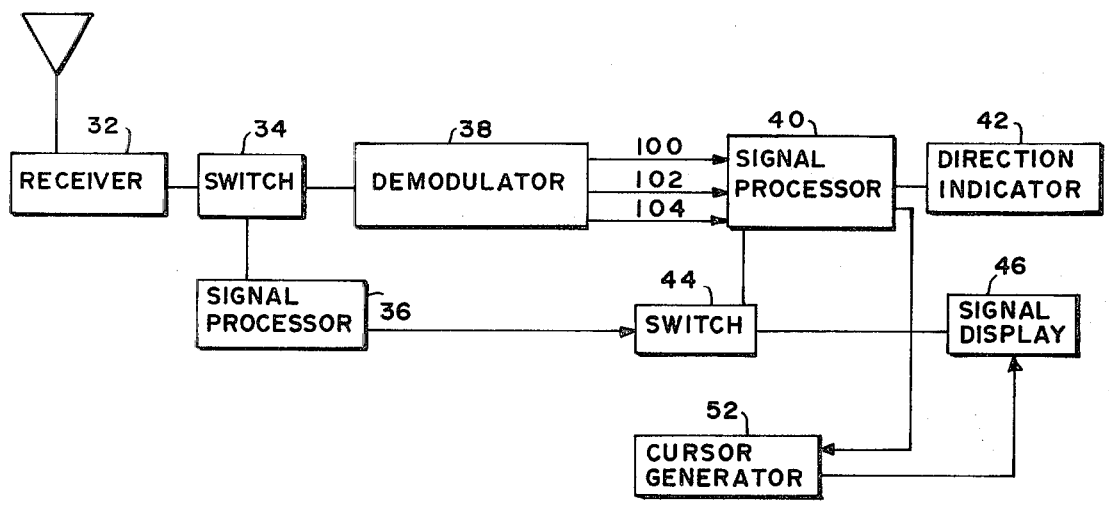
FIG. 1
INVENTOR.
ALFRED L. MALLETT
BY
ATTORNEY 3,870,989

UNDERWATER DIRECTION SIGNAL PROCESSING SYSTEM

FIELD OF THE INVENTION

This invention relates primarily to electronic systems used to detect the presence of ships and submarines.

DESCRIPTION OF THE PRIOR ART

In anti-submarine and ship operations, sonobuoys are dropped from aircraft to the surface of the ocean. Hydrophones are then suspended from the sonobuoys and convert acoustical signals received from submarines and ships to electrical signals. It is these signals which are transmitted from the buoys to the aircraft or ship, where they are processed to locate the submarine.

Modern submarines, however, are characterized by both high speeds and great maneuverability. Thus, receiving systems must readily process signals and accurately locate the desired target, so that the detected vehicle can be closely tracked and held under surveillance.

Present electronic systems process all the acoustic signals simultaneously received at the hydrophones. Correspondingly, the system display units also illustrate all signals that come within the frequency response range of the hydrophones. It is well known that different objects in the ocean will present an acoustic signal characterized by a discrete frequency. Thus, it becomes more difficult to detect and track one desired target, when the hydrophones are responding to many targets simultaneously.

Other electronic systems simultaneously process all the frequency signals produced by the hydrophone through a number of discrete frequency chanels. Such a system necessarily duplicates many system components since each channel is designed to operate at a discrete frequency. These factors add considerably to the expense of the system.

Further, the direction of the target is ascertained by comparing the amplitudes of the electrical outputs of a number of hydrophones disposed in an array of sonobuoys. Accuracy of an arrangement of this type requires both individual calibration of all the hydrophones and precautions against changes in their characteristics.

SUMMARY OF THE INVENTION

Accordingly, it is a primary object of this invention to provide a novel and improved signal processing system;

an additional object of this invention is to provide a signal processing system which is capable of selecting one discrete frequency within a range of frequencies for processing;

it is a further object of this invention to provide a signal processing system which is capable of converting the relative amplitude of the selected signal to a signal having a phase which is related to the direction of the acoustical energy;

another important object of this invention is to process this phase related signal and provide an output which accurately indicates the direction of said incoming acoustical energy.

According to this invention, this and other objects which will become apparent upon reading the specification are embodied in apparatus comprising a signal processing system which is capable of selecting a signal occurring at a discrete frequency from many signals over a range of frequencies for processing. The frequency of the selected signal is then translated down to a signal at a lower frequency and passed through a narrow band filter designed to reject all other frequencies. This signal is then converted to a signal having a phase which is indicative of the direction of the acoustical energy, and the phase related signal is processed providing an output indication of the direction of the incoming energy.

BRIEF DESCRIPTION OF THE DRAWINGS

For a fuller understanding of the nature in objects of the invention reference should be had to the following detailed description taken in connection with the accompanying drawings, in which:

FIG. 1 is a schematic representation of a sonobuoy unit and a receiving unit;

DETAILED DESCRIPTION OF THE PREFERRED EMBODIMENTS

Figure 2A:
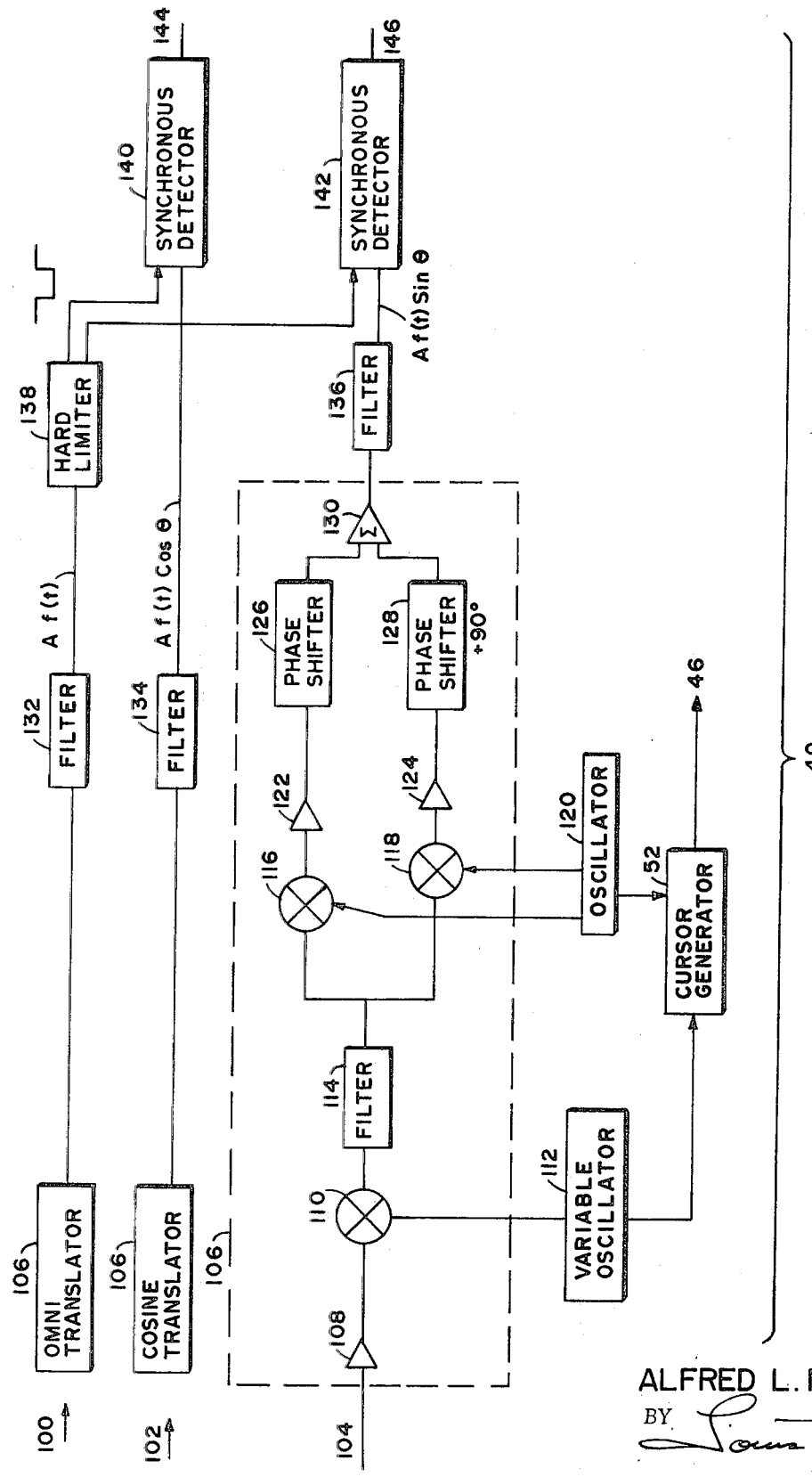
FIGS. 2A and 2B are a schematic diagram of the signal processing system incorporating the invention.
Figure 2B:
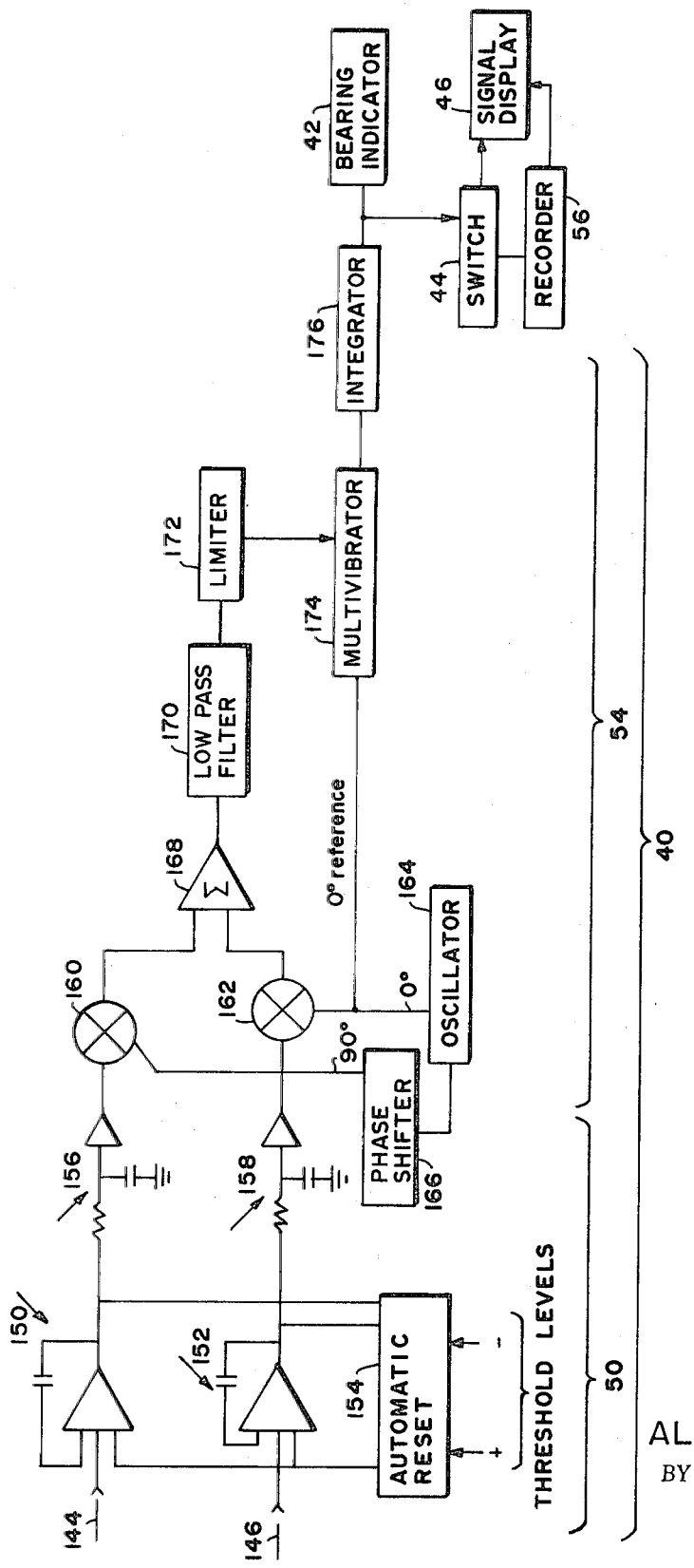

An operational system embodying the invention is illustrated in FIGS. 1, 2A and 2B and includes a sonobuoy unit having two directional hydrophones 14 and 16, an omnidirectional hydrophone 12, a compass transducer 26, a modulator unit 28, a transmitter unit 30, a receiver unit 32, a switch 34 which directs acoustic signals through a conventional signal processor 36 or a signal processor unit 40 which is the object of this invention. Hydrophone output signals, at a frequency determined by the source of acoustical energy, are combined with signals from the compass transducer 26 and transmitted to the receiver and signal processor units. Receiver unit 32 removes a carrier frequency component used to transmit the electrical signals and the signal processor unit 36 processes the electrical signals capable of being displayed on display unit 46. When the conventional signal processor 36 is used, display unit 46 simultaneously presents all signals falling within the frequency response spectrum of the hydrophones.

In general, the relative amplitude of the signal detected by a directional hydrophone depends on its direction of arrival with respect to the sensitive axis of the hydrophone. In the system described herein the direction of the acoustic signal is determined by ascertaining the ratio of the amplitudes of the output signals of two directional hydrophones so arranged that their axes are perpendicular to each other. This eliminates such factors as signal intensity and hydrophone sensitivity. Thus, the ratio of the signal is a function only of the direction of the target and is independent on the intensity of the incoming acoustical energy. All that is required is that the two directional hydrophones in the sonobuoy have the same sensitivity or that the ratio of their sensitivities be known. Thus, it is a simple matter to equalize sensitivities merely by attenuating the output of the more sensitive hydrophone.

With a bidirectional hydrophone the type preferably used in this invention, there are four possible directions of arrival for any given relative signal amplitude, that is, one in each quadrant. In the present invention, the signals from each directional hydrophone are compared with the output signal of the omnidirectional hydrophone to determine which quadrant contains the target.

To preserve the directional information in the hydrophone signals it is only necessary to preserve the ratio of the signal level from the two directional hydrophones. This may be accomplished by modulating the same subcarrier signal with the signals from both of the hydrophones using the same form of modulation in all cases. The attenuation of the signals is thus the same from modulation of the subcarrier on through the transmission from the sonobuoy and finally demodulation of the radio frequency signal received at the receiving station. Accordingly, the handling of the signals from the time they leave the hydrophone until they are demodulated has no change whatsoever in the ratio of the amplitudes of the signals received from the hydrophone. As will be explained below, the signal received from the omnidirectional hydrophone is used only for phase information and, consequently, there is no need to preserve its relative amplitude, and at the frequencies used, preservation of the phase information provides no problem.

Briefly the hydrophones 14 and 16 used with the invention described herein are suspended below the surface of the water to convert incoming acoustical signals into corresponding electrical signals. These transducers, which are schematically shown in FIG. 1, are characterized by the azimuthal directivity pattern shown in the drawing. More particularly, they have sensitive axis 18 of maximum responsive to incoming energy and null axis 20 of minimum response. The transducers are affixed to a supporting structure (not shown) with their sensitive axis preferably orthogonal to each other.

The hydrophones described herein are directional, that is, the output voltge of the transducer is a function of the cosine of the angle between the common axis of the hydrophone on the axis of the coil motion in the direction of the received acoustical energy. In particular, the output voltage $e_{14}$ of hydrophone or transducer 14 is related to the various relative parameters as follows:

$$e_{14} = Af(t) \cos \theta \tag{1}$$

where
 $\theta$ is the angle from the sensitive axis 18 of the transducer 14 to the direction of arrival of the incoming energy (arrow 24); $f(t)$ represents the incoming pressure wave as a function of time; and $A$ is the transfer function of the transducer or its sensitivity.

Similarly, the output voltage of $e_{16}$ of transducer 16 is given by $$e_{16} = Af(t) \cos \alpha \tag{2}$$

where
 $\alpha$ is the angle from the sensitive axis 18 of the transducer 16 to the direction of the incoming acoustical wave.

Since the sensitive axis of hydrophones 14, 16 are orthogonal to each other, $\cos \alpha = \sin \theta$ and equation 2 can be rewritten as $$e_{16} = Af(t) \sin \theta \text{ and} \tag{2A}$$

assuming that transducers 14 and 16 have equal sensitivities, $$e_{16}/e_{14} = \sin \theta / \cos \theta = \tan \theta \tag{3}$$

Thus, by calculating the ratio of $e_{16}$ to $e_{14}$, one may readily ascertain the angle $\theta$. Nevertheless, calculation of the absolute value of $\tan \theta$ in the above manner does not in itself determine unambiguously the direction of the source of the acoustical signal. For each absolute value of $\tan \theta$ there are four possible directions, one in each of the quadrants defined by axes 18 and 20 of FIG. 1. This quadrant ambiguity is resolved by means of phase comparisons.

The phase of the output signal of each of the bidirectional transducers or hydrophones 14 and 16 depends on the direction of arrival of the acoustical input signal. In particular, a signal arriving from one side of the null axis 20 will have a phase opposite to that of a signal arriving on the other side of the null axis. On the other hand, an omnidirectional transducer 12 suspended along with transducers 14 and 16 provides an output signal whose phase is independent of the directional of the input signal. By comparing the phase of the signal from the omnidirectional transducer with a phase of the outputs of the directional transducers 14 and 16, the system ascertains for each directional transducer hydrophone the side of the null axis 20 thereof on which the incoming signal is arriving. Thus, these two phase comparisons provide the required quadrant information.

For purposes of illustration, assume the incoming acoustical signal arrives from the direction indicated by the arrow 24. A comparison of the phases of the outputs of the transducers 14 and 16 provides the information that the direction of arrival is on the upper side (FIG. 1) of the null axis 20 of the hydrophone 14; that is, corresponding to the arrow 24 of the first quadrant of the arrow 24A in the second quadrant. A similar comparison involving the hydrophone 16 provides the information that the direction of arrival is on the righhand side of the null axis 20 thereof, that is, corresponding to the arrow 24 in the first quadrant or the arrow 24B in the second quadrant. Together the two comparisons indicate that the signal source must be in the first quadrant and therefore in the direction of the arrow 24, whose exact angular relationship with the hydrophone or transducer axis is ascertained in the manner described above. Conventional phase detectors can make the two phase comparison and simple logic circuits can process the output of the phase detectors to provide desired quadrant information.

The earth's magnetic reference is introduced into the system by a compass transducer generally indicated at 26. This compass may be similar to the one set forth with particularity in U.S. Pat. No. 3,264,554, issued to Hayner et al., assigned to the assignee of this application. In essence, an oscillator and a phase shifter provides four signals having successive quadrature relationship to stator elements in the compass transducer 26. The stator elements are oriented to the hydrophone sensitive axis 18 such that the stator elements rotate in direct relationship with a movement of sensitive axis 18. A rotor element in transducer 26 is oriented to the earth's magnetic axis, for example, the rotor is formed from magnetic material. The resulting output voltage of the transducer has a phase which depends upon the angular relationship between the rotor and stator elements.

The output signal of the compass transducer is combined with each of the individual hydrophone signals, and the resultants thereof are always related to magnetic north by a specific phase angle. The output of the omnidirectional hydrophone 12 is summed with the output of modulator 28 at the input of transmitter 30. The resultant signal transmitted from transmitter 30 is received at the processing station and applied to receiver 32.

Normally, the output signal of receiver 32 is applied to a signal processor 36 and the output thereof is displayed at signal display unit 46. The signals dislayed at unit 46 includes all of the signals detected by the sonobuoy unit; that is, all signals which fall within the frequency response spectrum of the hydrophones. For example, the hydrophones may simultaneously detect acoustic signals occurring at 50, 100, 200 and 700 Hz respectively. Thus, display unit 46 would indicate a target occurring at each of these frequencies and it would be difficult if not impossible to differentiate these frequencies as to the direction of their sources.

It is a feature of this invention to be able to select one discrete frequency at display unit 46 and process this signal to give bearing information of the target. An output signal of a cursor generator 52 appearing on display unit 46 is positioned around a frequency line of interest, for example, a signal at a frequency of 100 Hz. The positioning of the cursor also tunes signal processor unit 40 to process all signals at the desired frequency or in the example at 100 Hz.

At this time, the output of switch unit 34 is applied to demodulator unit 38. Demodulator 38 demodulates the signal from the subcarrier signal applied in modulator unit 28. A voltage controlled reference oscillator (not illustrated) in unit 38 is arranged to provide an output having a phase equal to the phase of the outputs of compass transducer 26. By passing the modulated output signals of hydrophones 14 and 16 and the output of the reference oscillator through synchronous detectors (not illustrated), the output signals from demodulator 38 are identical to the electrical signals produced by hydrophones 12, 14 and 16 and identified as 100, 102 and 104 respectively. signals 100, 102 and 104 are then applied to signal processor 40, the invention embodied herein.

This processor unit 40 includes a frequency translator section 106, in each signal path, followed in turn by low pass filters 132, 134 and 136, synchronous detectors 140 and 142 in the two bidirectional signal lines, an integrator section 50, a bearing computer section 54, and a directin or bearing indicator unit 42.

A feature of this invention is the frequency translator section 106 which segregates the desired frequency of interest from the broad band noise lbackground signals by translating the desired acoustic signal at a particular frequency through heterodyning to a signal having a predetermined frequency that will pass through a low pass filter 136. The output of filter 136 is applied to a set of integrators 150, 152 which convert the signals containing the quadrature directional component to a signal of a constant value independent of the initial dynamic range. The average constant level signal is then used to modulate 90° and 0° components of an arbitrary reference carrier 25 in a bearing computer section 54 to produce a dc signal level which is proportional to the bearing angle, that is, the source of the acoustical signal.

For purposes of explanation a signal representative of 100 cycles will be passed through signal processor 40 and sin translator unit 106. The two signals processed in the other translator sections will be processed in a simlar manner.

Acoustical signal 104 applied to translator unit 106 from demodulator 38 initially are amplified in amplifier 108 and applied as one input to a mixer stage 110. The second input to mixer stage 110 is received from a variable oscillator 112. Oscillator 112 generates a frequency which will heterodyne with any frequency in the acoustic range to produce a desired intermediate frequency signal such as 10 khz. The output of variable oscillator 112 is tuned when generator 52 positions a cursor around a frequency line of interest on display unit 46. For the example selected, the output of oscillator 112 is at 9.9 khz and the signal out of mixer 110 will have a frequency of 10 khz. This intermediate frequency signal is then applied to low pass filter 114 which only passes signals at the intermediate frequency of 10 KHz and attenuates harmonics of the intermediate frequency, more particularly, the third and higher harmonics. The output signal from filter 114 is then applied as the first input to mixers 116 and 118. The second input to mixers 116 and 118 is received from a fixed oscillator 120. The output signal from oscillator 120 applied to mixer 116 is 90° out of phase with the signal applied to mixer 118.

The frequency of this oscillator signal is such that when it is heretodyned with the intermediate frequency (i.f.) signal, the resultant signal will have a desired difference frequency, for examkple, 25 cycles. In our example, the frequency of the signal from oscillator 120 is 9975 hz. The desired difference frequency is the center frequency of a narrow band filter which subsequently appears in each channel.

This second heterodyne stage is unique in that it passes products of the fixed oscillator mixing with the i.f. signal which appear above the fixed carrier frequency, while it causes cancellation of products below the fixed carrier frequency. For example, the i.f. frequency is 10 khz and fixed oscillator frequency is 9975 hz. When these two signals are heterodyned, the products are 25 hz and 19.975 hz. One product occurs at the center frequency of the narrow band filter appearing in the system. Another frequency in the frequency spectrum of the hydrophones can produce a signal having 25 hz. Consider a response at 50 hz with oscillator 112 set to select a 100 hz signal. A 50 hz signal will heterodyne with a 9.9 khz signal to produce a 9850 hz and a 9950 hz signal. The fixed frequency signal at 9975 hz then heterodynes with the 9950 hz signal to produce a 25 hz signal and 19,925 hz signal. This 25 hz signal also will pass through the narrow band filter. This second heterodyne stage, however, is designed to cancel a mixer product with a frequency (9950 hz) below the frequency of the fixed oscillator (9975 hz), and will be subsequently explained. The purpose is to eliminate the effect which sometimes occurs and is called image rejection.

The product signals of mixers 116 and 118 are amplified in amplifiers 122 and 124 respectively, and the outputs, thereof, are applied to phase shifters 126 and 128 respectively.

It is in this section of the second heterodyne stage which assures that all products of mixing with a frequency below the frequency of oscillator 120 will be cancelled. The output signals of phase shifters 126 and 128 are then combined in a summing network 130 where cancellations described above take place. The process described hereinbove takes place in both the omni and cosine translators.

At this time, the output signals of the summing network 130, for each line, are applied to the narrow band filters 132, 134 and 136 respectively. The frequency of the signals appearing at the output of the summing network 130 are the center frequency of the narrow band filters, in the example 25 hz.

The acoustic signal 100 appearing at the output of filter 132 has the form $$A f(t) \text{ tm} \quad (4)$$

and acoustic signal 102 appearing at the output of filter 134 has the form $$A f(t) \cos \theta \quad (5)$$

and acoustic signal 104 appearing at the output of filter 136 has the form $$A f(t) \sin \theta \quad (6)$$

Expressions 5 and 6 have the same form as expressions 1 and 2A because demodulator 38 removes from the signals that angle that may be present when the responsive axis 18 of the hydrophones is something other than 0° from magnetic north.

The omnidirectional signal from filter 132 is then applied to limiter 138 which "hard limits" the signal; that is, converts into square waves without shifting their 0 axis crossing. Acoustic signals 102 and 104 of the directional hydrophones are then applied to synchronized detectors 140 and 142 respectively. Also, the output of limiter 138 is applied as a second input to each of the synchronous detectors 140 and 142.

At the input to the detectors, the relative amplitude of the signals 102 and 104 represent the bearing information of the source of the acoustic signal and the relative instantaneous polarities of the signals when compared with the polarity of the omnidirectional signal indicates the quadarnt containing the source. The synchronous detectors 140 and 142 are designed so that the output thereof is a full wave rectified signal of positive polarity if the output signal from the respective filters 134 or 136 is in phase with the output signal of limiter 138. The output signals of synchronous detectors 140 and 142 will be of negative polarity if the acoustic signal from filters 134 or 136 is of opposite or out of phase with the signal received from limiter 138. By this process, the synchronous detectors assign definite polarity signs to the sin and cosine signals received from filters 134 and 136 and thereby defines the bearing quadrant of the source of acoustic noise.

The acoustic signals, now represented as full wave rectified signals from synchronous detectors 140 and 142, identified as 144 and 146 respectively, are applied to linear integraters 150, 152 respctively.

Accordingly, the signals applied to integrators 150 and 152 are accumulated over a predetermined period of time thereby building up a charge on its capacitor until the integrator is reset, otherwise, the capacitor will continue to charge until its associated circuitry runs into electrical saturation. An integrator system can be reset manually by a system operator or be reset automatically. A feature of this invention is to provide an integrator system with automatic reset capabilities when the integrator capacitor has accumulated a predetermined charge. Since the accumulated charge determines the point of reset of the integrator rather than a fixed time interval, the integration time is a function of the signal strength. More particularly, the time of integration is inversely proportional to the signal strength, providing a system which automatically adapts to signal strength.

The output of integrators 150 and 152 are applied as one input to the reset unit 154, and a second input to unit 154 comprises a positive or negative voltage or threshold level. Through the use of logic circuits a reset signal from unit 154 is automatically applied to integrators 150 and 152 simultaneously setting them back to a zero reference level, when the output of either one of the two integrators 150 and 152 reaches a value which is equal to the positive or negative threshold level.

Both integrators 150 and 152 are reset together so that the relative amplitudes of the signals 144 and 146 which contain the bearing information are not destroyed. Automatic resetting of both integrators 150 and 152 at a fixed predetermined threshold level maintains the relationship between the two directional hydrophone acoustic signals and, therefore, the output of the linear integrators 150 and 152 also have this same relationship. The output signal of the linear integrators 150 and 152 is a sawtooth wave form, with the peak amplitudes containing the bearing information.

The output signals of the linear integrators are applied to exponential integrators 156 and 158, respectively, which average out the sawtooth wave form and produce a dc signal level which is reflective of the mean value of the sawtooth wave form.

The output of the exponential integrators 156 and 158 are applied to mixer assemblies 160 and 162, respectively, as a first input thereof. The second signal input for the mixer stages is supplied from oscillator 164, a reference signal the frequency of which may be any arbitrary value, such as 2 khz. The second input signal applied to mixer 162 is at the carrier frequency and has a 0° reference component, and the input signal applied to mixer 160 has been shifted in phase by 90° after passing through phase shifter 166.

The affect of mixing a signal having a dc level and a signal at some arbitrary reference frequency is a signal at the reference frequency with the amplitude thereof being proportional to the dc level. Thus, the output of mixer 162 has a frequency equal to that of oscillator 164, a 0 phase reference and an amplitude related to acoustical signal 146. The outut of mixer 160 is at the same frequency but shifted in phase by 90° and whose amplitude is proportional to the acoustic signal 144.

The output of mixers 160 and 162 are then applied to a vectoral summing network 168 and the output of the summing network 168 is applied to a low pass filter 170. The output of summing network 168 and low pass filter 170 is a sin wave at the reference frequency, of constant amplitude and the phase of which is displayed from zero degree carrier reference of oscillator 164, by the acoustic bearing angle $\theta$. The output of the low pass filter 168 is applied to a limiter 172 or hard limiter which converts the sin wave to a square wave and this square wave is then applied as one of the inputs of a multivibrator circuit 174.

The multivibrator circuit is set by the leading edge of the reference signal from oscillator 164, having a 0° reference, and multivibrator 174 is then reset with the signal received from limiter 172. The output of multivibrator 174, a signal whose duty cycle is related to the acoustic bearing angle $\theta$, that is, the width of the pulse, is proportional to the angle $\theta$.

The output of multivibrator 134 is applied to exponential integrator 176 which averages the variable duty cycle wave form and produces a dc signal level proportional to the acoustic bearing angle $\theta$. Through appropriate design of resistive networks, the dc signal level from integrator 176 may be scaled so that the range of 0 to 360 millivolts represents a 0 to 360° bearing angle. This signal is then applied to a bearing indicator 42. Indicator 42 may be any type of digital device which will display any value from 0 to 360, for example, a digital voltmeter Further, this same signal from integrator 176 may be applied through switch 44 to signal display 46 or a memory unit device 56 which would give a bearing time history of the acoustic signal. Memory unit 56 would store the received analog information. Then, by applying appropriate readout instructions, unit 56 would present a bearing time history of the acoustic signal which could be applied to a permanent recorder unit 58 or display unit 46.

The translator unit 106, as previously discussed, is designed to select a signal frequency from the input sonic band and translate it through a two step heterodyne process into a narrow band filter having a fixed center frequency.

Assume signal 104, a sonic band of frequencies containing a frequency amplitude to be selected through frequency translation and narrow band filtering, as follows:

$$\cos w_n t$$

and the signal from the variable oscillator 112 is represented by:

$$\cos w_b t$$

then these two signals are mixed in unit 110, the signals can be represented by:

$$\tfrac{1}{2} [\cos (w_b - w_n)t + \cos (w_b + w_n)t]$$

The carrier and its lower and upper sidebands. The signal of interest in the input sonic band is now translated such that it appears as a discrete intermediate frequency in the upper side band. The entire lower sideband falls below the intermediate frequency.

The second mixer is a quadrature mixture stage wherein the output of the first mixer is heterodyned with two quadrature components of the second carrier frequency: $\cos w_c t$ and $-\sin w_c t$. We first consider the sin portion of the quadrature mixer.

One signal from oscillator 120 applied to mixer 118 is represented by:

$$-\sin w_c t$$

then the output of mixer stage 118 can be represented by $$\tfrac{1}{2} [\cos (w_b - w_n)t + \cos (w_b + w_n)t] [-\sin w_c t] \text{ or}$$

(11)

$$\tfrac{1}{2} \sin(-w_c)t [\cos(w_b - w_n)t + \cos(w_b + w_n)t]$$

(11a)

$$\tfrac{1}{4} [\sin(-w_c - w_b + w_n)t + \sin(-w_c + w_b - w_n)t + \sin(-w_c - w_b - w_n)t + \sin(-w_c + w_b + w_n)t]$$

(11b)

The following frequencies will fall outside of the bandwidth of the phase shifter 126 and filter 136, and therefore, can be treated as filtered:

$$\sin(-w_c - w_b + w_n) \text{ and}$$
$$\sin(-w_c - w_b - w_n)$$

Thus, equation 11b can be rewritten as $$\tfrac{1}{4} [\sin(-w_c + w_b - w_n) + \sin(-w_c + w_b + w_n)]$$

(11c)

To illustrate folder cancellation as it occurs through the use of phase shifters 126, 128 and summing 130, the polarity of the terms in the last expression is evaluated for mixing products of frequencies above and below the carrier frequency $w_c t$. Since the sonic frequency of interest has been translated to appear in the upper sideband of the first modulator at a finite intermediate frequency, carrier $w_c t$ operates on the upper sideband; and the lower sideband being entirely below $w_c t$ is not considered. If we let $$w_b - w_n - w_c = M$$
$$w_b + w_n - w_c = N$$

equation 11c can be expressed $$\tfrac{1}{4} [\sin(-M)t + \sin(N)t] \text{ if } (w_b + w_n) > w_c$$

(12)

$$\tfrac{1}{2} [\sin(-M)t + \sin(-N)t] \text{ if } (w_b + w_n) < w_c$$

(12a)

Expression 12 and 12a can be expressed in an alternative form, as follows:

$$\tfrac{1}{4} [-\sin(M)t + \sin(N)t] \text{ and}$$

(13)

$$\tfrac{1}{4} [-\sin(M)t - \sin(N)t]$$

(13a)

The signal from oscillator 120 applied to mixer 116 is represented by:

$$\cos w_c t$$

Then, the output of mixer stage 116 can be represented, as follows:

$$\frac{1}{2} [\cos (w_b - w_n)t + \cos (w_b + w_n)t] \cos w_c t \quad (14)$$

$$\frac{1}{4} [\cos (w_b - w_n - w_c)t + \cos (w_b - w_n + w_c)t + \cos (w_b + w_n - w_c)t + \cos (w_b + w_n + w_c)t] \quad (14a)$$

Also the following frequencies will fall outside of the bandwidth of phase shifter 126 and filter 134 and, therefore, can be treated as filtered out.

$$\cos (w_b - w_n + w_c) \text{ and}$$
$$\cos (w_b + w_n + w_c)$$

Therefore expression 14a can be expressed as $$\frac{1}{4} [\cos (w_b - w_n - w_c)t + \cos (w_b + w_n - w_c)t] \quad (15)$$

If we let $$w_b - w_n - w_c = M \text{ and}$$
$$w_b + w_n - w_c = N$$

then equation 15 can be expressed as $$\frac{1}{4} [\cos (-M)t + \cos (N)t] \text{ if } (w_b + w_n) > w_c \quad (15a)$$

and $$\frac{1}{4} [\cos (-M)t + \cos (-N)t] \text{ if } (w_b + w_n) < w_c \quad (15b)$$

which can be expressed as $$\frac{1}{4} [\cos (M)t + \cos (N)t] \quad (16)$$

through the following identity: $\cos (-M)t = \cos (M)t$

If the signal represented by equations 13 and 13a is shifted 90° relative to equation 16 as it is passed through phase shifter 128, the equations can be written as $$\frac{1}{4} [-\cos (M)t + \cos (N)t] \text{ when } (w_b + w_n) > w_c \quad (17)$$

$$\frac{1}{4} [-\cos (M)t - \cos (N)t] \text{ when } (w_b + w_n) < w_c \quad (17a)$$

Now if the outputs of phase shifters 126 and 128, equations 16, 17 and 17a, are vectorally added in summing network 130, the output of unit 130 can be written as $$\frac{1}{2} \cos (N)t \text{ when } (w_b + w_n) > w_c$$

and $$0 \text{ when } (w_b + w_n) < w_c$$

It is thus seen that the output of a sin section changes phase 180° as the signal is changed in frequency from above carrier frequency $w_c t$ to below the carrier frequency. Further, the output of the cosine section does not change phase as the signal changes frequency. Thus, when the output of the sin section is shifted in phase by 90°, and then vectorally added to the output of the cosine section, all frequencies appearing on one side of the carrier frequency are cancelled while all frequencies on the opposite side of the carrier frequency are in phase and, therefore, add. Thus, the translator section only processes the selected frequency.

Figure 3:
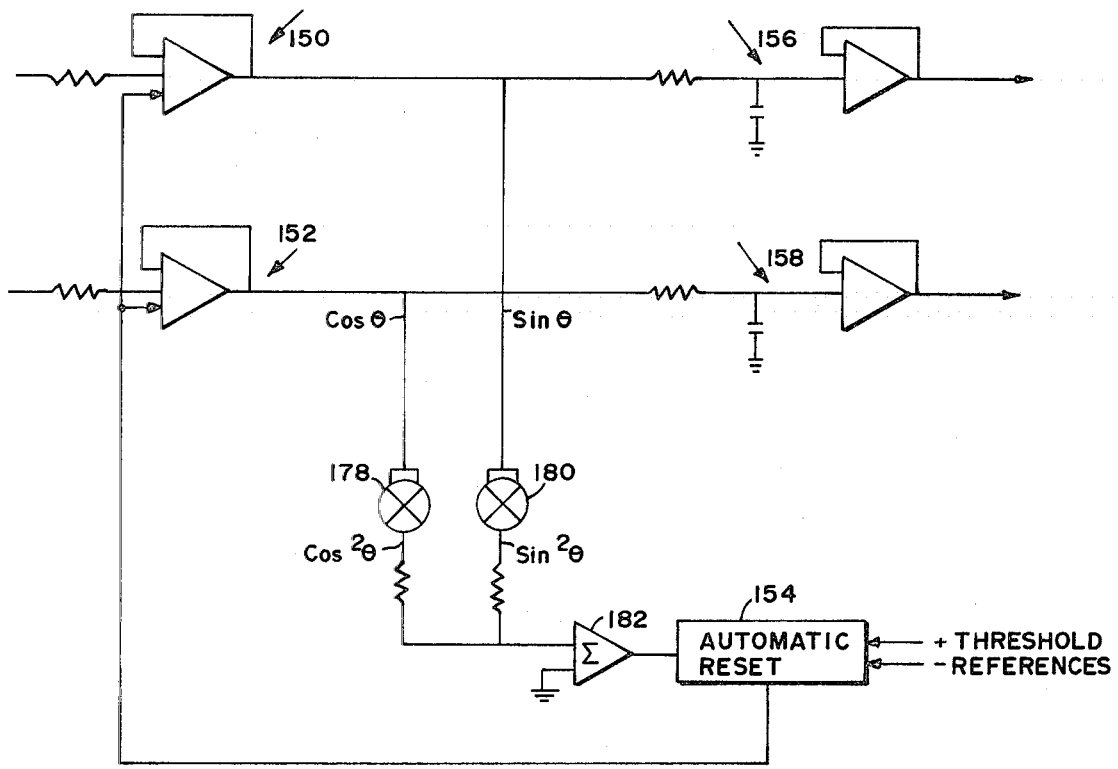
FIG. 3 is a schematic diagram of an alternative integrator system used in the receiving system.

FIG. 3 illustrates an alternative system for resetting the sin and cosine channel integrators.

The integrator system described in FIGS. 2A and 2B changes the sin and cosine functions to tan and cot functions because of the automatic reset system. Since the larger of the sin and cosine functions cause both integrators to reset simultaneously, the result is the smaller function is algebraically divided by the larger function, as follows:

if the sin function reaches the threshold level then $$K (\sin \theta/\sin \theta) = K \text{ (threshold level)}$$
$$K (\cos \theta/\sin \theta) = K \cot \theta$$

if the cosine function is larger $$K (\sin \theta/\cos \theta) = K \tan \theta$$
$$K (\cos \theta/\cos \theta) = K$$

The system described, however, does not alter the sin and cosine relationships and the angle computer section treats them as sin and cosine values.

In the alternate system, the output of each linear integrator is applied to the input of linear multipliers 178 and 180, respectively. The linear multiplier is a device that provides an output signal which is the square of the input signal. For example, the input from integrator is $A \cos \theta$ and the output of multiplier 178 is $A^2 \cos^2 \theta$.

The output of multipliers 178 and 180 are applied to summing network 182. The output of the summing unit 182 is applied as one input to automatic threshold unit 154. In this example, the output of summing unit 18 has the form $A^2 \cos^2 \theta + B^2 \sin^2 \theta$ and, therefore, reset unit 154 is designed to recognize the square of the threshold level and not the threshold level and not the threshold level.

In this examle, the sin and cosine functions are not changed to tan and cot functions. The addition of two squares in a right triangle equals the square of the hypotenuse and the angle variable is removed from consideration. Further, the locus of points described by the square of the hypotenuse is a circle and hypotenuse becomes the radius of the circle. Since the sum of the square of the sin and cosine functions will always equal the square of the radius of a circle, the threshold level is always a constant. Thus, the bearing angle computer analyzes the sin and cosine functions and not the tan and cot functions as illustrated previously. In either case, the bearing angle computer determines the bearing angle of the acoustic signal.

It will be apparent that one may vary the system in a number of ways without departing from the scope of the invention. For example, the sensitive axes of the two directional hydrophones 14 and 16 are preferably perpendicular to each other, it is not necessary that one maintain this angular relationship but may use other predetermined angle relationships. This system, however, will add substantial complexity to the circuits. Also, the compass transducer is merely illustrative of various bearing transducers which can be used to relate the axes of the directional hydrophones to an external fixed coordinate system.

It will thus be seen that the objects set forth above, among those made apparent from the preceding section, are efficiently attained, and since certain changes may be made in the above construction without departing from the scope of the invention, it is intended that all matters contained in the above-description or shown in the accompanying drawings shall be interpreted as illustrative and not in a limiting sense.

Having thus described the invention, what is claimed as new and desired to be secured by Letters Patent is:

1. A direction-finding system for ascertaining the bearings of sources of incident acoustical signals in water, said system having a plurality of transducers for converting said acoustical signals into at least a first and second electrical signals with said electrical signals comprising a plurality of frequency components, said transducers each generating an electrical signal that varies as a function of the angle between a sensitive axis of said transducer and the direction of the incoming acoustical signals with the sensitive axis of said transducers being oriented at a predetermined angle with respect to each other and to a known geographical reference; wherein the improvement comprises:
   a. frequency separating means adapted to receive first and second electrical signals, said frequency separating means arranged for separating each of said first and second electrical signals according to the frequency components thereof and to select a discrete frequency component in each of said electrical signals for processing;
   b. means for converting said selected frequency component of said first and second electrical signals to first and second amplitude related signals, the ratio of said first and second amplitude related signals corresponding to the tan of the bearing of said acoustical signal and the relative polarity of said first and second amplitude related signals being indicative of the quadrant containing the incident acoustical signal as measured from said known geographical reference, and
   c. bearing computation means, said computation means being responsive to the polarity and amplitude of said first and second amplitude related signals and arranged to provide an output signal representative of the direction of the source of said incident acoustical signal.

2. A direction-finding system described in claim 1, wherein said frequency separating means comprises:
   a first reference signal having a first frequency,
   first means to combine said first reference signal with said first and second electrical signals, to produce a third and fourth electrical signals having a frequency being greater than said first frequency and the frequency components of said first and second electrical signals,
   a second reference signal having a second frequency, said second frequency being less than the frequency of the combined signals, second means to combine said third and fourth electrical signals with said second reference signal, said second means being arranged to convert each of said third and fourth electrical signals combined with said second reference signal to a first and second pair of phase related electrical signals with each having frequency components greater than and less than said second frequency, said phases of said pair of electrical signals being arranged to cancel those electrical signals having a frequency on one side of said frequency and combine those electrical signals having a frequency on the opposite side of second frequency, and a third means to combine said first and second pair of phase related electrical signals producing said selected frequency component of said first and second electrical signals for processing.

3. A direction-finding system described in claim 2 wherein said second means includes a phase shifting network whereby one of said pair in each of said first and second pair of phase related signals is further shifted in phase by a predetermined angle, and
   summing means arranged to combine each of said first and second pair of phase related signals for producing said discrete frequency component signal in each of said first and second electrical signals for processing.

4. A direction-finding system described in claim 1 further including
   an omni-directional transducer providing an output electrical signal whose phase is independent on the bearing of said acoustical signal; and said bearing computation means arranged to compare the phase of each of said discrete frequency component signals with the phase of the output signal of said omni-directional transducer and producing a resultant signal for each of the compared signals having a first polarity if the compared signals are in phase and a second polarity if the compared signals are out of phase with the polarity of each of said resultant signals being indicative of the quadrant of said incident acoustical signal.

5. A direction-finding system described in claim 4 wherein said bearing computation means further includes:
   an integrator unit, said integrator unit being arranged to convert each of said resultant discrete frequency component signals to a pair of amplitude related signals whose amplitude ratio corresponds to the tan of the bearing of said incident acoustical signal.

6. A direction-finding system described in claim 1 wherein said bearing computation means includes:
   a reference signal source arranged to provide a first and second reference signals having the same frequency and related in phase by a predetermined angle, and
   means to combine one of said amplitude related signals with said first reference signal and the other of said amplitude related signals with the other of said reference signals, said means being arranged to sum each of the combined signals to provide a resultant signal having a frequency of said refernece signal and a phase angle essentially equal to the direction of said incident acoustical signal,
   second means arranged to combine said resultant signal with one of said first reference signals to produce a second combined signal having a constant amplitude and repetition rate and a pulse width which is relateed to the direction of said incident acoustical signal,
   third means adapted to convert the pulse width of said second combined signal to said output signal having an amplitude related to the direction of said incident acoustical signal, and
   display means responsive to said output signal and to provide a visual display of the direction of the source of said incident acoustical signal.

7. A direction-finding system for ascertaining the bearings of the sources of underwater acoustical signals, said system comprising a. a pair of bidirectional transducers, each of which has a response to incoming acoustical signals that is a cosine function of the bearing of the source of said acoustical signal relative to the sensitive axis of the transducer, and the sensitive axis of said transducer being arranged substantially perpendicular to each other, b. an omni-directional transducer having a response which is independent of the bearing of said acoustical signal, c. a reference signal source, d. means for modulating quadrature related signals from said reference source with the respective outputs of said bidirectional transducers and summing the modulated signals to provide a resultant signal whose phase angle relative to the phase of the signal of said reference source is substantially equal to the bearing of the source of said acoustical signal relative to the sensitive axis of one of said bidirectional transducers, e. a transmitter connected to effect a wireless transmission of the modulated signal and the output of said omni-directional transducer, f. a receiver arranged to receive the signals from said transmitter, said receiver including means for demodulating said resultant signal and providing a pair of amplitude related signals whose ratio is essentially equal to the tan of the bearing of said acoustical signal and for providing a signal equivalent to the response of said omni-directional transducer, g. signal translator means arranged for separating said amplitude related signals and said omni-directional signal according to the frequency components thereof and selecting one discrete frequency component present in each of said amplitude related signals and said omni-directional signal for processing and the amplitude ratio of the discrete frequency component of said amplitude related signals being equal to the bearing of said acoustical signal, h. means for comparing said discrete frequency component of said omni-directional signal with each of said discrete frequency component signals of said amplitude related signals and producing a first pair of amplitude related signals whose ratio is relative to the tangent of the bearing of the acoustical signals, and i. bearing computer means, said bearing computer means converting said pair of amplitude related signals to an output signal having a constant amplitude and fixed repetition rate and a pulse width which is proportional to the bearing of the source of said acoustical signal.

8. The system defined in claim 7 in which said signal translator means includes:

a first reference signal having a first frequency, means to combine said first reference signal with each of said amplitude related signals and said omni-directional signal to produce a first, second and third resultant signals having a frequency greater than said first frequency, a second refernece signal having a second frequency, second means to combine said first, second and third resultant signals with said second reference signal, said second means being arranged to convert each of said first, second and third resultant signals combined with said second reference signals to a first, second and third pair of phase related signals with each having frequency components greater than and less than said second frequency, the phases of said pair of phase related signals being arranged to cancel those electrical signals having a frequency on one side of said second frequency and add those electrical signals having a frequency on the opposite side of second frequency, and means to sum each of said first, second and third pair of phase related signals producing a pair of amplitude related signals and said omni-directional signal at said discrete frequency component for processing.

9. The system defined in claim 8 wherein said second means including a phase shifting network whereby one of said phase related signals is further shifted in phase by a predetermined angle.

10. The system defined in claim 8 wherein the means for comparing the discrete frequency component of said omni-directional signal with each of said amplitude related signals having said discrete frequency component includes:

a. a pair of phase detectors, each being arranged to receive said omni-directional signal and one of said pair of amplitude related signals at said discrete frequency component and adapted to provide a first output signal having a first polarity if the compared signals are in phase and a second output signal having a second polarity if the compared signals are out of phase, and b. a pair of integrators, each of said integrators arranged to receive one of said first or second output signals of one of said phase detectors, said integrators providing a first pair of amplitude-related signals whose amplitude ratio is essentially the tangent of the bearing of the source of said acoustical signal.

11. The systemm defined in claim 8 wherein said bearing computer means includes a. a third reference signal source having a third frequency and arranged to provide a pair of reference signals having the same frequency and related in phase by a predetermined angle, b. third means to combine one of said first pair of amplitude related signals with one of said third reference signals and the other of said amplitude related signals with the other of said third reference signals to produce a first and second combined signals, and c. fourth means to add said first and second combined signals to produce a combination signal having the frequency of said third reference signal and a phase which is shifted from the phase of one of said third reference signals by an angle essentially equal to said bearing of the source of said acoustical signal.

12. The system defined in claim 11 wherein said bearing computer means includes:

a. fifth means to combine said combination signal with one of said third reference signals to produce a second combination signal having a constant amplitude and repetition rate and a pulse width which is proportional to said bearing, and b. sixth means to convert said second combination signal to said output signal whose amplitude is equal to said bearing.

13. The system defined in claim 12 further including display means arranged to receive said output signal for processing and to provide a visual display of the direction of the source of said acoustical signal.

14. The system defined in claim 7 including computer means arranged to receive and store said output signal until receiving a readout signal, thereby producing a series of electrical signals giving the time bearing history of the direction of the source of said acoustical signal.

* * * * *